United States Patent [19]

Boyd et al.

[11] 3,895,296
[45] July 15, 1975

[54] FAULT INDICATOR
[75] Inventors: Robert Kent Boyd, Florissant; Allan Walter Lindberg, St. Louis, both of Mo.
[73] Assignee: International Telephone & Telegraph Corporation, New York, N.Y.
[22] Filed: Sept. 19, 1973
[21] Appl. No.: 399,080

[52] U.S. Cl. ................ 324/156; 73/431; 324/127
[51] Int. Cl. .............................................. G01r 1/04
[58] Field of Search ......... 324/156, 127, 51; 73/431

[56] References Cited
UNITED STATES PATENTS
2,579,170  12/1951  Bell ................................. 324/156

*Primary Examiner*—Alfred E. Smith
*Assistant Examiner*—Ernest F. Karlsen
*Attorney, Agent, or Firm*—James B. Raden; Marvin M. Chaban

[57]   ABSTRACT

Disclosed is the physical construction and electrical control circuit of a fault indicator designed to provide a water-tight structure for the indicator. One face of the indicator is visible through the sealing apparatus, the sealing apparatus enclosing the structure on all sides other than the indicator face side. The indicator is capable of being submerged and will withstand a water pressure of 8 psig to meet specifications established by electric utilities. The electrical control circuit normally causes the transformer to operate below its saturation level resulting in quick response to changes in input current, and providing improved temperature stability of the control circuit.

8 Claims, 8 Drawing Figures

3,895,296

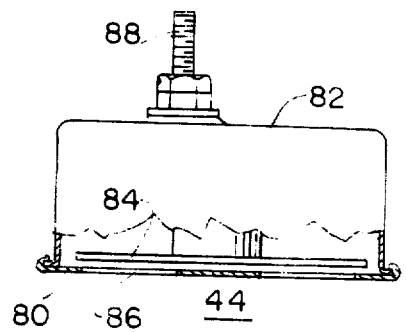
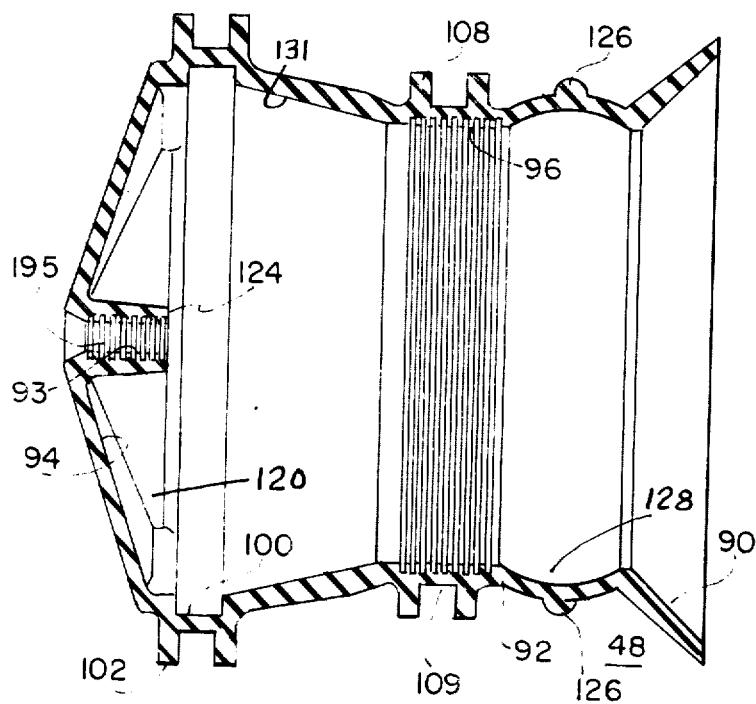
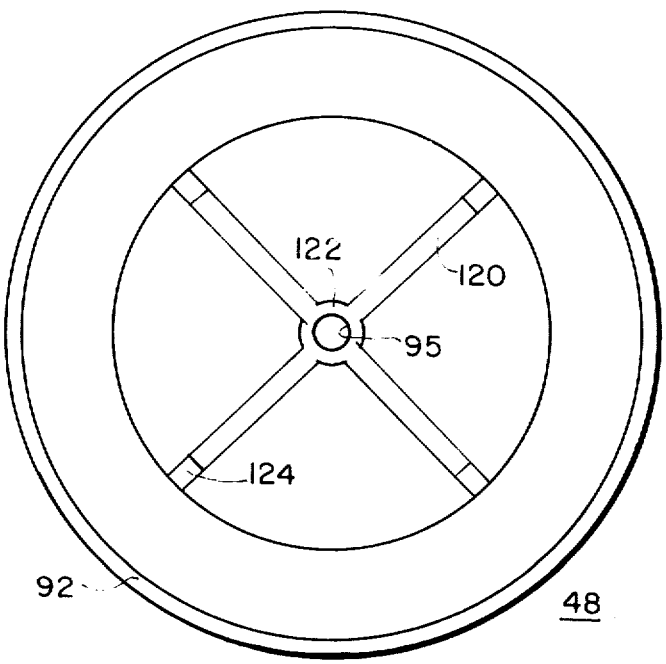

FAULT INDICATOR

BACKGROUND OF THE INVENTION:

Fault indicators of themselves are well-known in the art. The more recent indicators are self-contained, self-powered elements which include a split core which may be mounted about a conductor being monitored. Connected to the sensing coil on the core by a suitable conductor is the sensing circuitry and indicator. The sensing circuitry in some cases operates the transformer above its saturation level and thus diminishes its sensitivity, speed of response and temperature stability. The sensing circuit is generally mounted with the indicator within a casing. In some known installations, the indicator casing is made of Lexan plastic and surrounded by suitable sealing members. The Lexan plastic, however, has been found to permit moisture migration therethrough, and therefore, failures have occurred. As is wellknown in the more recent past, electrical distribution systems, especially for residential use, have been placed underground with transformers and other distribution elements positioned in vaults embedded in the earth. These vaults tend to fill with water on occasion, and submerge the conductor and other elements in the vault. The fault indicator therefore, must be sealed against failure due to submersion. Many forms of sealing structures are known in the art.

SUMMARY OF THE INVENTION:

The present invention comprises an improved fault indicator of the self-contained, self-powered type. The basic housing of the indicator encloses an indicator and an electronic sensor for triggering the indicator.

The electronic circuit responds to current conditions sensed by the transformer primary and will respond to an increase in such current speedily and consistently over a wide range of ambient temperature conditions. To ensure the speedy response and temperature stability of the circuit, the secondary of the transformer is loaded with a circuit of low ohmic resistance. The transformer is thereby operated below its saturation level. This form of operation ensures speedy transformer response (in less than ½ cycle). The unit will sense the fault condition before the normal fuse would blow and would provide an indication of the area where the fault occurred.

In the circuit, the change in current is sensed by a silicon bilateral switch to reverse the current to the meter, triggering the meter to a fault indication. The unit automatically resets on restoration of current to the normal level.

The housing comprises a cup-shaped transparent glass body with elongated sidewall. The indicator mounts within the housing body such that the circular face of the indicator is visible through the bottom of the cup body. The electronic sensor circuit is mounted within the body sidewall and is potted in place to physically permanently mount the circuit and indicator relative to the glass body. A sealing boot of rubber or other suitable elastomer mounts over the open face of the housing and extends beyond the visible base plate of the housing. The boot has an inner annular groove which mates with an end flange on the exterior of the tapering sidewall of the housing. The boot is configured closely to the external shape of the housing to seal tightly thereagainst. The boot acts as a cushion against physical damage and seals to the housing. About the midsection of the interior of the boot are a series of annular ribs which act to seal against the adjacent housing body. On the outer surface of the boot in the ribbed area, an annular channel is provided to receive a locking ring. This locking ring is affixed in the channel and prevents upward movement of the boot along the housing sidewall.

Adjacent the base of the housing, the boot has an outwardly tapered annular entrance, the boot seal extending beyond the housing base to thereby recess the housing base within the boot and prevent physical damage to the housing. Thus the housing is only exposed in the area of the face plate with the face plate recessed. In this manner, the boot provides a dual function of: (1) Sealing the water-impervious glass; and (2) Physically cushioning the glass against shock damage.

It is therefore an object of the invention to provide an improved sealing and cushioning apparatus for a fault indicator.

It is a further object of the invention to provide a glass housing for a fault indicator with an exterior sealing and cushioning boot surrounding the housing and allowing only the indicator face of the indicator to be visible externally of the boot structure.

It is a further object of the invention to provide a double sealing structure for a fault indicator capable of being totally immersed in liquid.

It is a further object of the invention to provide a sealing structure for a fault indicator with a water-impervious, transparent cover for the indicator, and a water-impervious shock-resistant material, sealed to the cover to fully protect the cover while allowing the indicator to be visible from the exterior of the structure.

It is a still further object of the invention to provide a fault indicator whose transformer is operated below the transformer saturation level to ensure fast operation over a wide range of ambient temperature levels.

BRIEF DESCRIPTION OF THE DRAWINGS:

FIG. 3 is a sectional view through the center of the boot in FIG. 2;

FIG. 4 is an elevational view of the boot of FIG. 3 viewed from the right side thereof;

FIG. 5 is a side view of the indicator meter as used herein, the showing of FIG. 5 being broken away to show the interior of the meter;

FIG. 6 is a front view in elevation of the face plate of the meter of FIG. 5;

Figure 1:
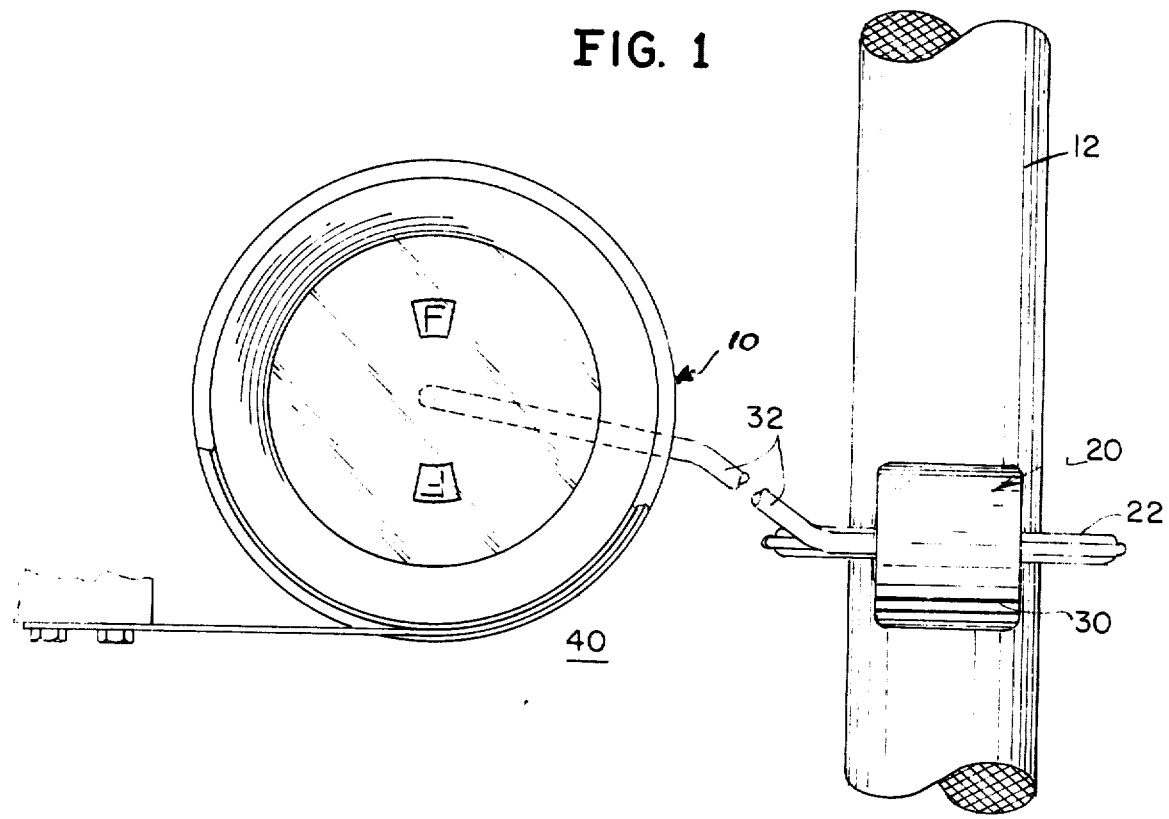
FIG. 1 is a plan view of an indicator apparatus employing the present invention.
Figure 2:
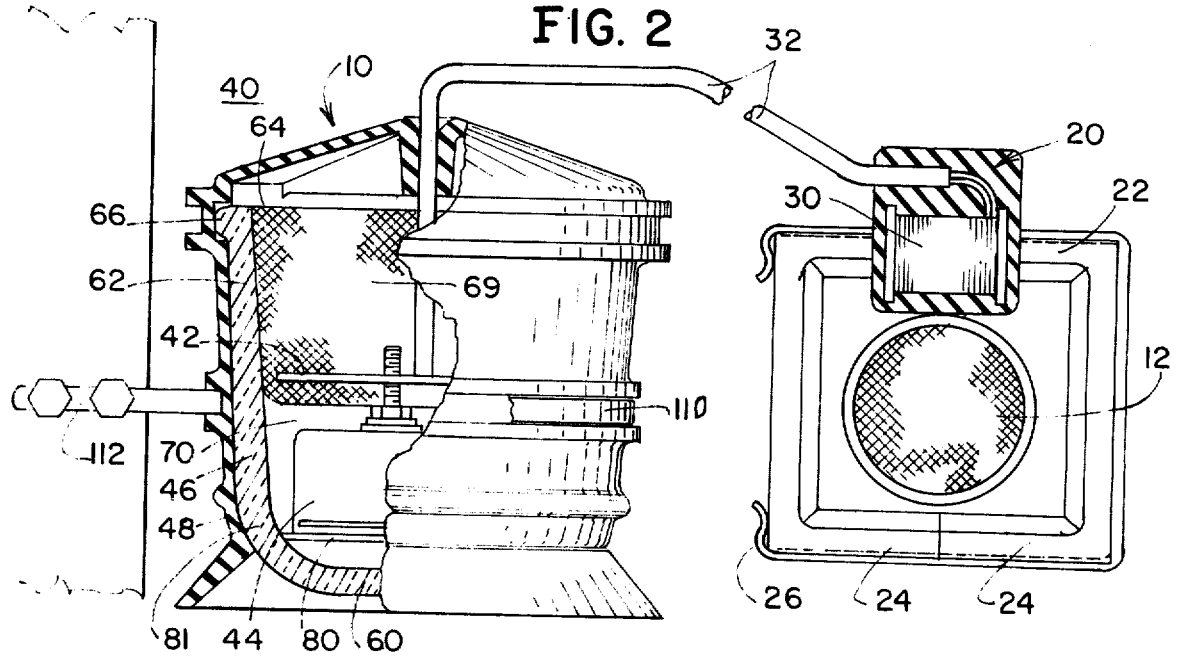
FIG. 2 is a side view in elevation partially broken away showing the indicator of FIG. 1 relative to a cable.

DETAILED DESCRIPTION OF THE DRAWINGS:

In FIG. 1, we show a fault indicator 10 employing our invention and applied to a cable 12, the current passing through which is to be monitored. The indicator 10 includes a split core current transformer 20 of any suitable type known in the art. The transformer core 22 is essentially toroidal and has a diametral split to form two U-shaped core sections 24. The core sections 24 allow the transformer to be fitted about the cable 12. The sections are held together by a suitable open-ended wire/spring bail 26. Mounted on one leg of the core is a sensing winding 30, the winding having a multiple conductor cable 32 connected thereto and extending from the winding for connection to the indicator main element. The cable 32 is covered with rubber or other suitable waterimpervious elastomer. The connection of the cable 32 to the winding 30 is effected by sealing the entry of the cable into the winding structure for a suitable length by permanently molding or otherwise sealing the cable 32 to the winding 30.

The main detector unit 40 of the indicator 10 is comprised of four components. These components include an electronic circuit board 42 which terminates the cable 32 and provides the current-sensitive detecting apparatus. The second component of the main unit is the indicating meter 44. The third element, a glass housing 46, suitably encases the meter and circuit board, the housing being enclosed itself within the fourth component, a rubber sealing boot 48.

The glass housing 46 is essentially a cup-shaped, one-piece structure of sufficient thickness to provide structural strength for the unit. We have found that a soda lime glass or boro silicate glass material of approximately 7/32 inch thickness provides the necessary degree of structural strength. The housing 46 has an essentially circular, clearly transparent, face 60 from which a slightly tapering, frusto-conic sidewall 62 extends. The sidewall terminates at an open, circular mouth 64, the mouth being greater in diameter than the diameter of face 60. A raised lip or flange 66 extends radially outwardly from the outer rim of the open-mouthed end of the housing, the lip or flange reinforcing the housing structure.

The meter 44 is mounted within the cavity 70 such that the circular disc face 80 of the meter is positioned parallel to and adjacent the housing circular face 60. The meter face 80 has a stationary plate which rests against the curvature of the housing at the junction 81 between the transparent housing face 60 and the sidewall 62. The meter used herein may assume any known form of meter suitable for use in fault indicators. However, we find that a meter of the type shown in FIGS. 5 and 6 may be used satisfactorily for the purpose shown. The meter has a cylindrical body 82 having a stationary face plate with spaced openings therein through which are visible a rotatable disc plate 84 with suitable indicia visible through the openings 86 in the disc 80. The meter has a coil responsive to sensed indications of the cable current to indicate N for normal current and to rotate plate 84 to position the F indications in the area of openings 86 to indicate a fault condition. By firmly connecting a rear mounting member 88 of the meter to the circuit board 42 and by fixing the circuit board firmly in place within the housing, the meter is thereby secured in place to be visible through the face 60 housing of the housing 46. The cable 32 is also secured electrically to the circuit board and extends for a distance through the block 69 of the potting material to provide a sealing relationship between the cable 32 and its connection to the circuit board 42.

Secured to the exterior of the housing 46 is the sealing boot 48 shown in greatest detail in the sectional view of the FIG. 4. The boot is a one-piece elastomeric member which is essentially cup-shaped or bell-shaped with a flared open mouth 90. The boot is sized for interference fit with the sidewall of housing 46 along at least one intermediate sidewall area 92 leading to the flared mouth 90 of the boot. The closed end 94 of the boot encloses the open mouth 64 of the housing to house and seal the electric elements within the housing. The mounting of the boot on the housing retains the circular face 60 of the housing exposed to allow the meter face to be visible from the outside of the boot. The essentially imperforate closed end 94 of the cup has a central tubular opening 95 sized to fit tightly about the cable 32.

A series of annular ribs 93 within the cylindrical tubular opening 95 for the cable serve to seal an elongated area of the cable to the housing. The inner wall of the boot 48 has an annular channel 100 adjacent the closed end which mates with the raised lip 66 of the glass housing to firmly position the housing and boot relative to one another and to deter and prevent ready removal of the boot from the housing. This is accomplished by a combination holding ring mounting strap being welded to itself in a channel around the perimeter of the boot in front of the glass flange. The ribs 96 define an area of maximum sealing between the boot and the housing substantially intermediate along the height of the boot sidewall in an area in which the boot makes surface contact with the outer surface of the housing in an area of regular configuration. The inner sidewall of the boot is ribbed annularly through this maximum sealing area. The outer periphery of the boot in this maximum sealing area has a pair of spaced annular ridges 108 forming an annular channel 109 between. The annular channel forms a seat for a holding ring 110, the ring being tightly and permanently affixed in the channel, which helps to create pressure of the boot against the glass for added sealing.

This holding ring 110 may be a ring of stainless steel strap formed circularly and welded at the mating of the strap ends, with a hanger extension 112 protruding from the ring. The hanger extension of ring 110 may be used to anchor the unit to any suitable stationary member. The ring body performs the dual function of preventing axial movement of the boot relative to the housing and tends to hold the boot area of maximum sealing tightly against the adjacent glass housing sidewall. The shape of the sealing boot has been carefully configured in a number of areas. Reinforcing and shock cushioning ribs 120 have been molded or otherwise suitably formed within the closed end of the boot as can be seen in FIGS. 3 and 4. These ribs are angularly spaced to extend radially from a central reinforcement 122 of the tubular cable opening to an abutment 124 adjacent the annular channel 100. These abutments and ribs cushion the end of the glass housing.

Internal ribs 120 mate with the upper surface of the potting compound to prevent flexing of the cable seal under water pressure. Further, under conditions where the unit is submerged, the potting compound acts to form a boot support as well as a final seal between the glass and the cable jacket to prevent water from passing to the circuit and meter. The potting compound tends to flex and maintain its bond and seal over the entire temperature range met by the fault indicator, i.e. −40° to + 85°C.

Externally, a pair of peripheral ridges 102, serve to reinforce the end of the housing and act as a bumper to cushion the end of the unit against shock. Another peripheral bumper rib 126 about the curved portion 128 of the boot which covers the curved housing junction section 81 acts to cushion shocks received by the base end of the housing along with the boot flared mouth.

The wall thickness of the boot is tapered slightly in the area 96 of maximum sealing to complement the taper of the housing. The taper in the area of numeral 131 complements the draft angle of the glass when the boot is positioned properly so the outside surface of the boot has parallel walls for mounting the strap. Thus, the surface area presented for the strap ring 110 is a cylindrical one allowing the strap to seat smoothly on the boot and not cut into the boot when tightened in place. Likewise, pressure can be applied by the strap distributed around the circumference of the boot for additional sealing strength.

For assembly of the main detector unit, the meter is assembled to the circuit board 42 by means of meter mounting member 88; the interconnecting cable 32 is threaded through the tubular opening and is affixed to the transformer 20. The connection of cable 32 into the transformer is suitably sealed, as shown in FIG. 1. The assembly is sealed within the housing by a waterproof potting compound sealing the mouth of the housing. The compound which we have found to be most successful is a flexible polyurethane sold under the trademark Leepoxy 20-154 by the Leepoxy Plastics Corporation of Fort Wayne, Ind. A mesh paper bag is inserted to allow the compound to set in place and adhere to the glass, to the cable and to the other elements to which exposed.

The meter face 80 is positioned adjacent and substantially parallel to the housing base 60 to render the meter face visible. The boot is slipped over the housing and drawn taut to fit housing flange 66 within the channel 100 and with the boot abutments 124 in contact with the end of sidewall 62 adjacent the housing mouth 64. The curved portion 128 of the boot seats tightly about the housing junction area 81.

The area 96 of maximum sealing is positioned with its ribs in tight sealing surface contact with the adjacent sidewall of the housing. The holding ring 110 is formed and is welded to lock the ring in place and leave the extension 112 free for connection to any suitable surface.

Within the structure as described, the elastomer to glass seal serves as the main and primary seal. A secondary or double seal is formed by the potting compound within the glass. The potting compound also forms a surface for the infringement of ribs 120 and structurally supports the unit for a proper seal.

Figure 7:
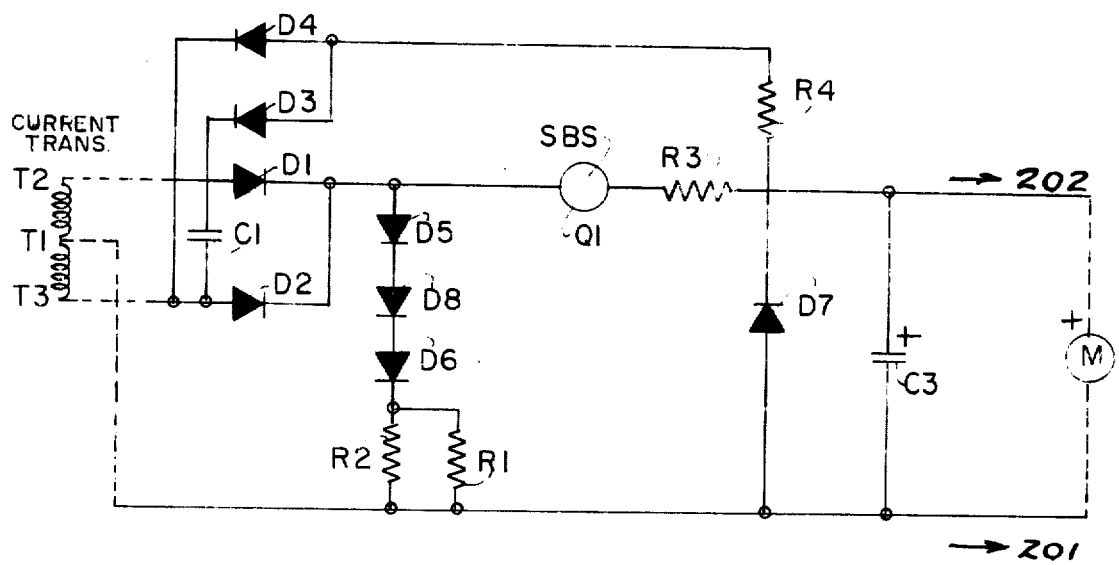
FIG. 7 is a schematic diagram of the sensing circuit used herein.

The electronic circuit of FIG. 7 provides direct current flow through the meter 10 in response to current being sensed by the current transformer 20. The polarity of the meter current is in the direction of arrow 201 when the sensed current is below a set value and reverses to the direction of arrow 202 when sensed current is greater than the set value. The set value is referred to as the fault current setting or trip setting. The bistable meter is positioned to a reading referred to as "normal" with the sensed current flow less than the trip setting. When the sensed current flow is greater than the trip setting, the meter moves to its other state and indicates "fault."

In the operation of the circuit, output from the center tapped current transformer secondary 20 is rectified by two pairs of rectifier diodes. The common cathodes of diodes D1 and D2 provide a positive voltage and the common anodes of diodes D3 and D4 provide a negative voltage in response to sensed current. The positive voltage is applied to a trigger device (Q) and to current shunt resistors R1 and R2 through the diode string D5, D8 and D6. When the sensed current is very low, this positive voltage is low and is below the forward conductor threshold of the series diodes and is also below the breakdown of the trigger so no current flows through this path. For intermediate values of sensed current, the positive voltage is sufficient to make the diode string conduct. The current flowing in the shunt resistors R1 and R2 becomes a measure of the sensed current. As can be seen from the circuit, the voltage of the shunt resistors combined with the forward conduction voltage of the diode string is applied to the terminal of the triggering device. When the net voltage across the trigger device reaches its breakdown value (typically, about eight volts), the trigger becomes conductive and as long as current is maintained, it behaves approximately as though it were a forward biased diode.

The value of the shunt resistors R1 and R2 is very low, the parallel path resistance of R1 and R2 in combination being about 5–60 ohms (dependent on the trip valve of the device). This low resistance provides the device with operation characterics such that as the sensed current increases to the trip current value, this breakdown voltage is achieved at the crest value of the rectified voltage wave. Once the breakdown is achieved, the flow through the current limiting resistor R3 into the meter circuit is sufficient to move the meter to the fault position.

For values of sensed current below the trip value, the meter is positioned to its normal reading by the current flow through resistor R4 into the negative voltage point provided by diodes D3 and D4. For intermediate sensed current values, the current flow through the meter circuit creates sufficient voltage drop to forward bias diode D7 to conduction. This conduction stabilizes the voltage on the negative terminal of the trigger Q so that the trigger is properly responsive to the sensed current.

A critical requirement of the device is to provide a resetting of the indicator from fault to normal with a minimal amount of sensed current, (typically, 3 amperes). The circuit is very efficient in providing that reset because at low values of sensed current, the said diode string does not conduct and the only current which flows is through resistor R4 and the meter circuit.

The capacitor C3 is provided to smooth out or filter the pulsating current flowing in R4 and when tripped in R3 so that a steady indicator reading is maintained.

Capacitor C1 does two things: It provides a leading power factor load on the current transformer to tune out some of the magnetizing current required by the core. Also, its low impedance at high frequency provides useful reverse voltage protection for the rectifier diodes.

Trigger device Q is a silicon bilateral switch (SBS) of the type sold by the General Electric Company (2N4991) as a silicon planar, monolithic integrated circuit having the electrical characteristics of a bilateral thyristor with a temperature stabilized voltage triggering level.

With an apparatus such as that shown herein we have been able to provide a ±10% stability over an ambient temperature range from −40° C. to +85° C. A unit is provided with a basic operating level of 200 amps, 300 amps or 400 amps. Thus for a 200-amp device, we provide a device which normally monitors at the 100 amp level and will respond to excess current at the level of 200 amps or higher, in a short span of time with the actual speed of response being dependent on the amount of excess current over the operating level.

Figure 8:
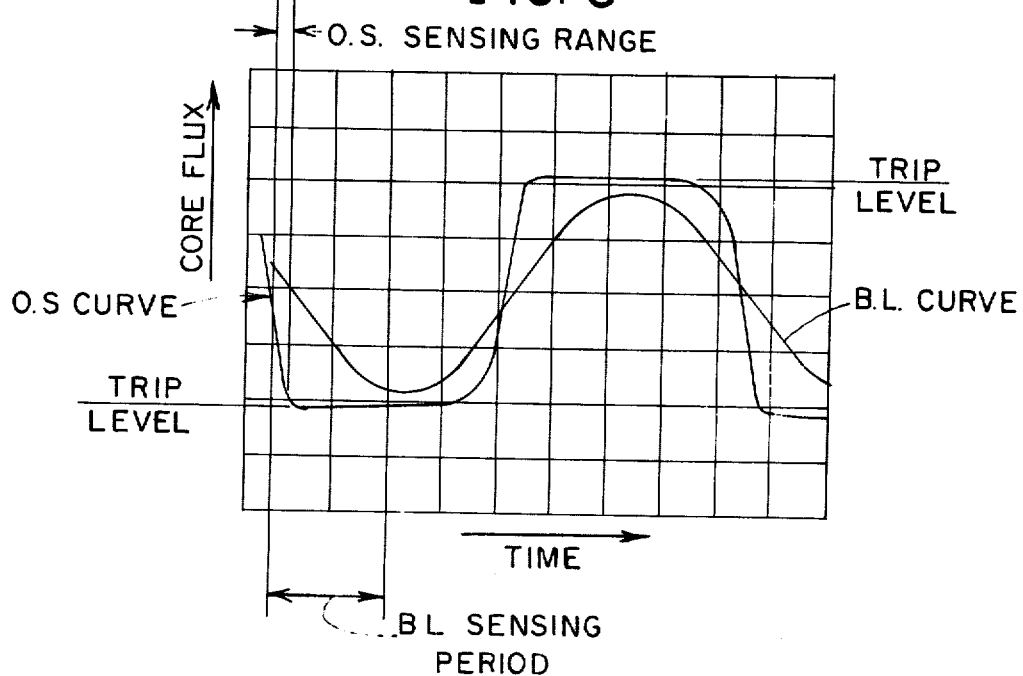
FIG. 8 is a graph of the curve of the response of the transformer of the present invention to change in current as contrasted with other known systems which saturate the transformer core on each half-cycle.

In FIG. 8 is shown the response curve of the present transformer core to currents slightly less than the trip value for which the circuit of FIG. 7 is set viewed against the response time. For example, the graph of FIG. 8 was viewed for units having a 300 amp fault trip value, the curves exhibiting passed current at the 285 amp level. This level is one slightly below the trip value for each unit shown. The curve labeled BL represents the core flux viewed for a circuit as shown in FIG. 7. It can be seen that for each A.C. cycle, the flux follows the sine curve of input current rather closely. Thus, any increase in current will be sensed quickly to increase the flux in a properly speedy manner and to cause the secondary current to respond equally quickly.

The curve labeled OS is taken using a device of known type which uses resistances of 10 K ohms across the transformer secondary to cause the transformer core to saturate on the amplitude of voltage across the transformer secondary exceeding a predetermined level. The curve labelled OS is saturated quickly on each half-cycle. Therefore, the only period in which an excess of sensed input current can be translated into a voltage increment is the period before saturation. This period is extremely short in duration and the sensing circuit must be extremely sensitive to act on this excess in one or two half-cycles. In the present invention, low resistances R1 and R2 are positioned in parallel between the opposite ends of the transformer secondary and the center tap T1. This secondary loading provides the transformer core response characteristic to a sensed sine wave as shown in FIG. 9. With the transformer core unsaturated, increases in input current such as those due to fault conditions will be detected rapidly to cause the indicator to change to its fault state. The operation at lower than saturated levels plus the comparatively slow build-up of the sine wave provide a considerably longer period to detect the high current of a fault and to react to same.

Thus, the indicator device disclosed provides a high speed of response within a package which may be submerged safely and may endure wide temperature differentials without adversely affecting its response characteristics.

We claim:

1. A submersible fault indicator structure comprising: a meter having a viewing face therein; a onepiece rigid housing with a transparent base at one end, an open mouth at the other end and a continuous sidewall therebetween, said meter mounted in said housing with the meter face viewable through the transparent base of the housing; a unitary elastomeric boot including a base end, an open mouth and a continuous wall therebetween, said boot sized to stretchably cover and engage said housing in a tight sealing fit between the sidewall of said housing and the wall of said boot, to waterproofingly seal the open mouth of said housing and to render the base of said housing visible through the mouth of said boot, and waterproofing sealing means on the interior wall of said boot for mating with the sidewall of said housing, further means in the base end of said boot for receiving and sealing the entry of a cable into said housing open mouth, and wherein said boot flares from said sealing means and extends radially outwardly beyond said housing base to comprise an open shielding hood for said base to cushion said base against shock.

2. A submersible structure as claimed in claim 1, wherein there are internal peripheral cushioning ribs extending inwardly from the wall, said boot engaging said housing to firmly engage said housing and external peripheral ribs on said boot cushioning said structure against shock.

3. A submersible fault indicator structure comprising: a meter having a viewing disc face therein; and including a cup-shaped one-piece, glass housing with a transparent circular base at one end, an open mouth at the other and a sidewall therebetween, said meter mounted in said housing with the meter disc viewable through the transparent base of the housing, an annular stepped flange surrounding the mouth of said housing; a one-piece bell-shaped elastomeric boot including a base end and an open mouth, said boot shaped to surround said housing in a tight stretchable fit against the sidewall thereof to completely enclose in a waterproof manner said housing mouth with the base of said housing visible through the mouth of said boot, a plurality of annular waterproofing sealing ribs on the interior wall of said boot for mating with said flange to prevent relative movement between said boot and said housing; and an enclosing ring affixed about said boot to lock said boot to said housing to prevent removal of the boot from the housing.

4. A submersible structure as claimed in claim 3, wherein said housing sidewall tapers outwardly from said base end and said boot is stretchable to mate with said housing taper, and the mouth of said boot is flared outwardly from contact with said housing and extends beyond the disc face of said housing in axial and radial direction to cushion said housing against shock.

5. A submersible structure as claimed in claim 4, wherein there are internal peripheral ribs on said boot engaging said housing to firmly cushion said housing against shock and vibration axially and radially, and annular ribs spaced along the exterior of said boot to cushion said structure against shock.

6. A submersible structure as claimed in claim 5, wherein there is a filler of potting material within said glass housing covering the mouth thereof to form a secondary sealing arrangement.

7. A submersible fault indicator for sensing current conditions in a conductor comprising: transformer means inductively coupled to the conductor, a meter having a viewing face therein; a rigid housing of water impervious material with a transparent base at one end, an open mouth at the other and a sidewall therebetween, said meter mounted in said housing with the meter face viewable through the transparent base of the housing; a circuit board connected to said meter and positioned within said housing, said board including a plurality of circuit components within a circuit connected to said transformer means by a cable extending from said housing; a unitary boot of waterproof elastomeric material including a base end and an open mouth with an enclosing sidewall therebetween, said boot sized to surround said housing and cover the open mouth of said housing in a tight sealing fit between the sidewall of said housing and the sidewall of said boot and render the base of said housing visible through the mouth of said boot with said boot otherwise surrounding said housing, a continuous peripheral waterproofing channel about the interior wall of said boot for receiving a continuous stepped flange surrounding the mouth of said housing; further sealing means on said boot for sealing the cable entry into said housing; and an enclosing strap affixing said boot to said housing to prevent removal of the boot from the housing.

8. An indicator as claimed in claim 7, wherein said circuit includes an integrated circuit current condition sensor.

* * * * *